(12) United States Patent
Newman

(10) Patent No.: US 11,570,378 B2
(45) Date of Patent: Jan. 31, 2023

(54) METHODS AND APPARATUS FOR METADATA-BASED PROCESSING OF MEDIA CONTENT

(71) Applicant: GoPro, Inc., San Mateo, CA (US)

(72) Inventor: David A. Newman, San Diego, CA (US)

(73) Assignee: GOPRO, INC., San Mateo, CA (US)

( * ) Notice: Subject to any disclaimer, the term of this patent is extended or adjusted under 35 U.S.C. 154(b) by 162 days.

(21) Appl. No.: 16/934,628

(22) Filed: Jul. 21, 2020

(65) Prior Publication Data

US 2022/0030177 A1 Jan. 27, 2022

(51) Int. Cl.
*H04N 5/262* (2006.01)
*H04N 5/232* (2006.01)
*G11B 27/034* (2006.01)

(52) U.S. Cl.
CPC ......... *H04N 5/2621* (2013.01); *G11B 27/034* (2013.01); *H04N 5/23254* (2013.01)

(58) Field of Classification Search
CPC .................................................. H04N 5/2621
USPC ......................................................... 348/239
See application file for complete search history.

(56) References Cited

U.S. PATENT DOCUMENTS 9,681,111 B1 * 6/2017 Newman .............. G11B 27/034

\* cited by examiner

*Primary Examiner* — Joel W Fosselman
(74) *Attorney, Agent, or Firm* — Wang Hardoon, P.C.

(57) ABSTRACT

Methods and apparatus for metadata-based cinematography, production effects, shot selection, and/or other content augmentation. Effective cinematography conveys storyline, emotion, excitement, etc. Unfortunately, most amateur filmmakers lack the knowledge and ability to create cinema quality media. Various aspects of the present disclosure are directed to, among other things, rendering media based on instantaneous metadata. Unlike traditional post-processing techniques that rely on human subjectivity, some of the various techniques described herein leverage the camera's actual experiential data to enable cinema-quality post-processing for the general consuming public. Instantaneous metadata-based cinematography and shot selection advisories and architectures are also described.

20 Claims, 9 Drawing Sheets

METHODS AND APPARATUS FOR METADATA-BASED PROCESSING OF MEDIA CONTENT

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

This disclosure relates to image processing, and in one exemplary aspect to media capture ecosystems.

Description of Related Art

In traditional cinematography, raw footage is framed and shot under controlled circumstances. During post-processing and editing, shots are selected and assembled into scenes; scenes may be further augmented with production effects (visual and audio effects). The nearly ubiquitous availability of high-quality media has cultivated consumer tastes for high production value content; this often entails specialized equipment (camera dollies, stabilization rigs) and/or sophisticated editing techniques (e.g., sound effects, artistic visualizations, etc.).

Action cameras are a relatively recent phenomenon. Unlike traditional photography, action cameras are typically designed to capture immersive footage (e.g., 360° panoramic content). For a variety of reasons, action cameras are typically compact, ruggedized, and designed to require minimal interaction once recording has begun. In most situations, the action camera user cannot control shooting conditions; interesting moments fleetingly occur and often cannot be replicated. As a result, content generated by action cameras often require significant editing; a lot of raw footage may be uninteresting (e.g., the user may be waiting for action to happen), and shots may need to be re-framed (e.g., were captured off-center, etc.).

Effective cinematography conveys storyline, emotion, excitement, etc. While there are important differences between traditional and action camera footage, ultimately consumers often want the ability to achieve at least some cinema-like production values with their action cameras.

SUMMARY

The present disclosure discloses, inter alia, methods and apparatus for metadata-based cinematography, production effects, shot selection, and/or other content augmentation.

In one aspect, a method of capturing and delivering instantaneous metadata is disclosed. In one embodiment, the method includes: capturing media data at a rate; recording instantaneous metadata at the rate; where the instantaneous metadata corresponds to the media data; and delivering the media data and the instantaneous metadata to a post-processing device.

In one variant, capturing the media data comprises capturing audio data and visual data at a video frame rate.

In one variant, recording the instantaneous metadata comprises recording orientation, velocity, or acceleration data at a video frame rate.

In yet another variant, the method further includes receiving the instantaneous metadata from a networked device.

In another variant, the method further includes encoding the media data and the instantaneous metadata within a common data structure.

In another variant, the method further includes synchronizing the media data and the instantaneous metadata within a common data structure.

In a further variant, the method further includes encoding the media data within a first data structure comprising a first synchronization data; encoding the instantaneous metadata within a second data structure comprising a second synchronization data; and wherein the first synchronization data and the second synchronization data enable synchronization of the media data and the instantaneous metadata.

In one aspect, a media capture apparatus is disclosed. In one embodiment, the media capture apparatus includes: a first sensor configured to capture media data; a second sensor configured to record capture conditions of the first sensor; digital processor apparatus; and a non-transitory computer-readable media.

In one variant thereof, the non-transitory computer-readable media includes one or more instructions which when executed by the digital processor apparatus, causes the digital processor apparatus to: capture the media data at a rate; record the capture conditions of the first sensor at the rate; encode the media data within a media data structure; and encode the capture conditions within an instantaneous metadata data structure.

In an additional implementation, the first sensor comprises an audio/visual sensor and the media data comprises video data at a video rate. In one such variant, the second sensor comprises an inertial measurement unit and the capture conditions comprise orientation, velocity, or acceleration data at each video frame.

In one implementation, the first sensor comprises a first camera and a second camera, the second sensor comprises a proximity detector, and the instantaneous metadata data structure comprises a warp track for image stitching.

In another implementation, the first sensor comprises a first camera and a second camera, the second sensor comprises an inertial measurement unit, and the instantaneous metadata data structure comprises in-camera stabilization data.

In one implementation, the media capture apparatus further includes a network interface for connecting to another media capture device; and the one or more instructions when executed by the digital processor apparatus, further causes the digital processor apparatus to receive additional instantaneous metadata from the other media capture device.

In another variant, the media capture apparatus includes synchronization logic configured to synchronize the additional instantaneous metadata received from the other media capture device.

In a further variant, the media capture apparatus further includes a network interface for connecting to a post-processing device and the one or more instructions when executed by the digital processor apparatus, further causes the digital processor apparatus to stream the media data structure and the instantaneous metadata data structure to the post-processing device during capture.

In one aspect, a post-processing apparatus is disclosed. In one embodiment, the post-processing apparatus includes: a network interface; a user interface; digital processor apparatus; and a non-transitory computer-readable media. In one exemplary embodiment, the non-transitory computer-readable media includes one or more instructions which when executed by the digital processor apparatus, causes the digital processor apparatus to: obtain media data and instantaneous metadata; select a presentation parameter for the user interface; and render the media data based on the presentation parameter and the instantaneous metadata.

In one variant, the media data comprises audio data and video data, and the presentation parameter comprises a point-of view; the video data is cropped to the point-of-view, and the audio data is mixed based on the point-of-view.

In one variant, the presentation parameter comprises a point-of view, the instantaneous metadata comprises an orientation; and the media data is rendered based on a difference between the point-of-view and the orientation.

In one variant, the media data comprises video data, and the presentation parameter comprises a visualization rule based on the instantaneous metadata.

In one variant, the media data comprises audio data, and the presentation parameter comprises an audibilization rule based on the instantaneous metadata.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

In another aspect, a non-transitory computer readable storage apparatus implementing one or more of the foregoing aspects is disclosed and described. In one embodiment, the computer readable apparatus includes a program memory, or an EEPROM. In another embodiment, the apparatus includes a solid-state drive (SSD) or other mass storage device. In another embodiment, the apparatus includes a USB or other "flash drive" or other such portable removable storage device.

Other aspects, features and advantages of the present disclosure will immediately be recognized by persons of ordinary skill in the art with reference to the attached drawings and detailed description of exemplary embodiments as given below.

BRIEF DESCRIPTION OF THE DRAWINGS

The disclosed embodiments have other advantages and features which will be more readily apparent from the following detailed description of the invention and the appended claims, when taken in conjunction with the accompanying drawings.

All Figures disclosed herein are ©Copyright 2019-2020 GoPro, Inc. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Existing Audio/Visual Tracks and Post-Processing—

Figure 1A:
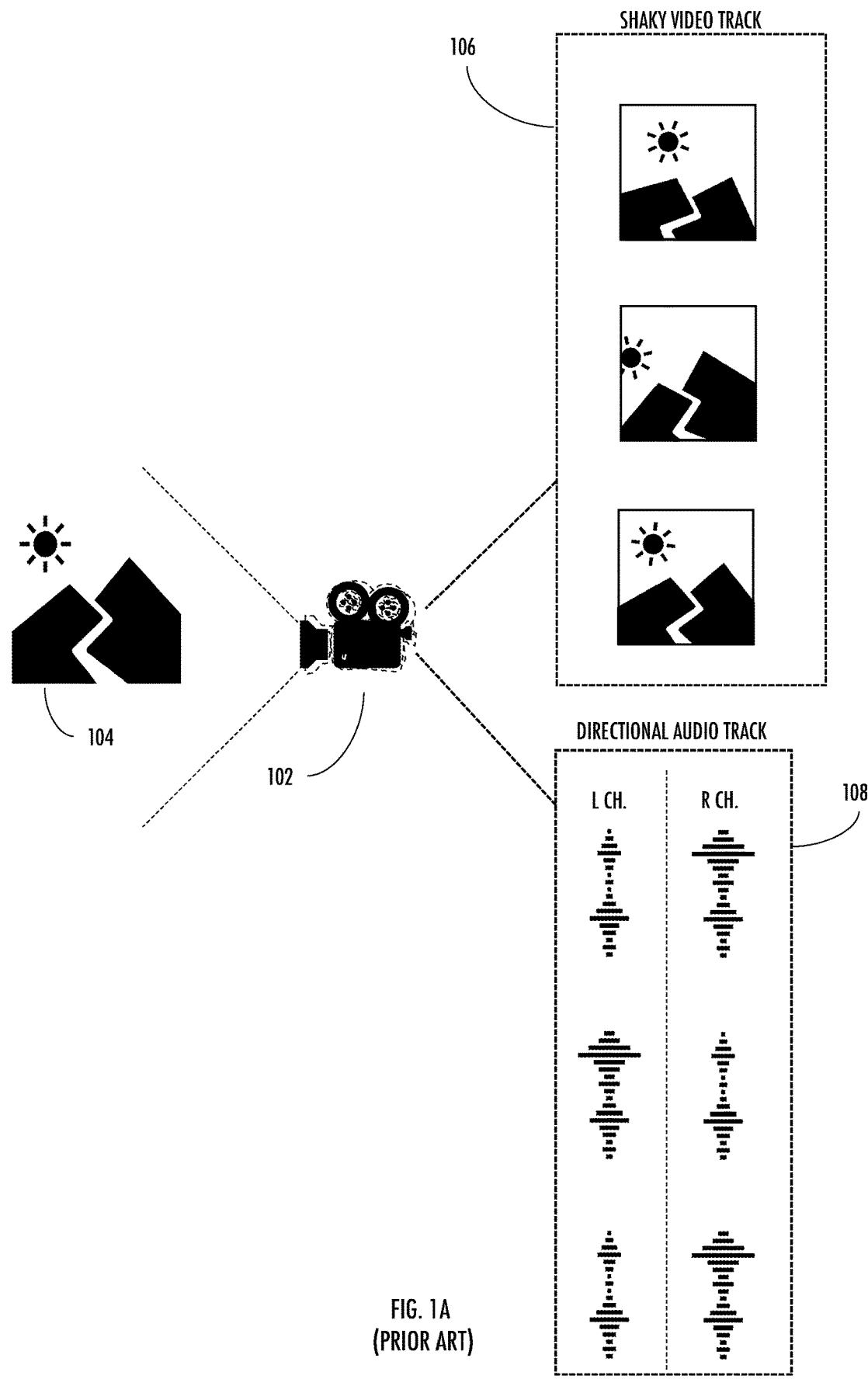
FIG. 1A is a graphical representation of a typical consumer-grade handheld video camera capturing footage, useful to illustrate various aspects of the present disclosure.

FIG. 1A is a graphical representation of a consumer-grade handheld video camera capturing footage, useful to illustrate various aspects of the present disclosure. As shown therein, the handheld camera 102 captures a subject 104 within a fixed field of view; the field of view for non-wide-angle cameras does not exceed 120°. The camera 102 additionally includes directional microphones that are mounted to the chassis to capture audio 108 in the direction that the camera 102 is pointed. Notably, the footage 106 is shakily captured because the camera experiences every movement of the user's body (including breathing and heart beats). In other words, the motion of the user creates an apparent motion in the captured images. Additionally, the directional microphone is a fixed component of the camera body; the videographer has only very gross control of the recorded audio. In some cases, the intended audio may not be effectively caught by the microphone or the microphone may catch undesired sounds.

Figure 1B:
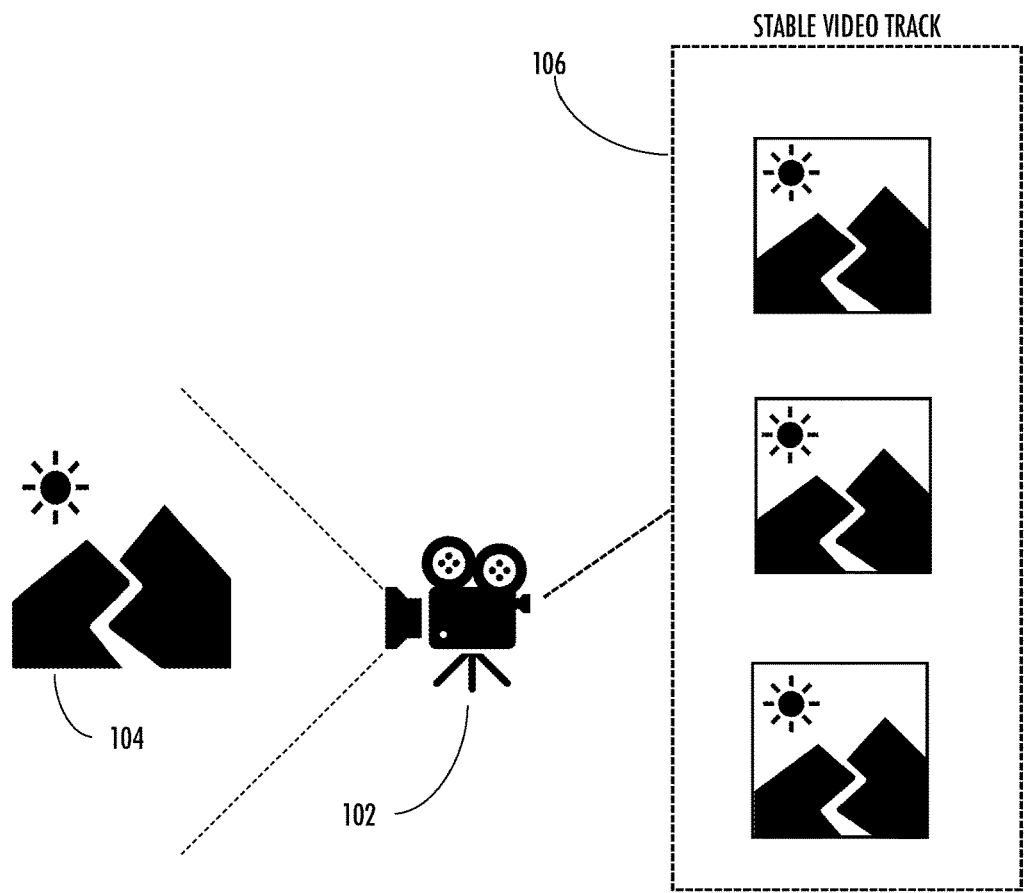
FIG. 1B is a graphical representation of a cinema-quality video camera and audio equipment capturing footage, useful to illustrate various aspects of the present disclosure.
Figure 1B:
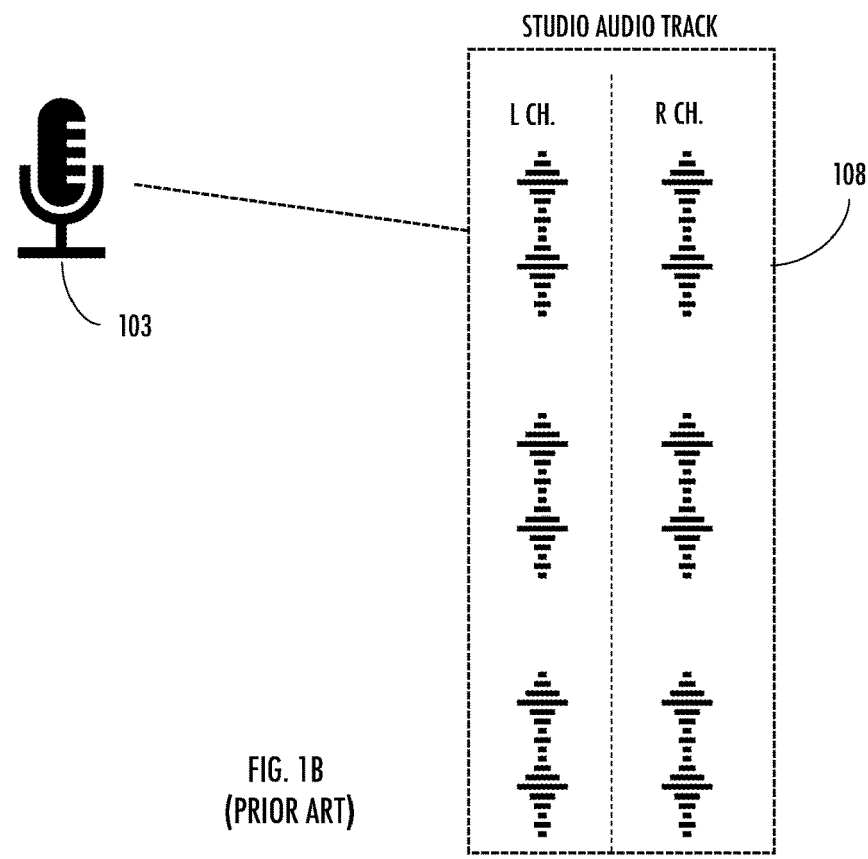

FIG. 1B is a graphical representation of a cinema-quality video camera capturing footage, useful to illustrate various aspects of the present disclosure. As before, the video camera 102 captures a subject 104. However, unlike handheld cameras, cinematic cameras are typically mounted on stabilizing apparatus (e.g., fixed tripods, camera dollies, camera trucks, stabilizing gimbals, etc.). Additionally, most directors use separate boom microphones 103 to capture audio or, in some cases, audio may be captured separately from video in a sound studio. Isolating the capture of video from audio, maximizes the director's flexibility. Video and audio can be separately recorded under carefully controlled environments. Additionally, video and audio can be spliced together from multiple "takes"; this enables a director to select the best scenes and re-arrange the story narrative in "post" (post-processing). The flexibility of post-processing greatly affects the resulting video and audio tracks (106, 108); high image quality, cohesive narrative, and crisp audio are the hallmark of cinema quality media.

Figure 2:
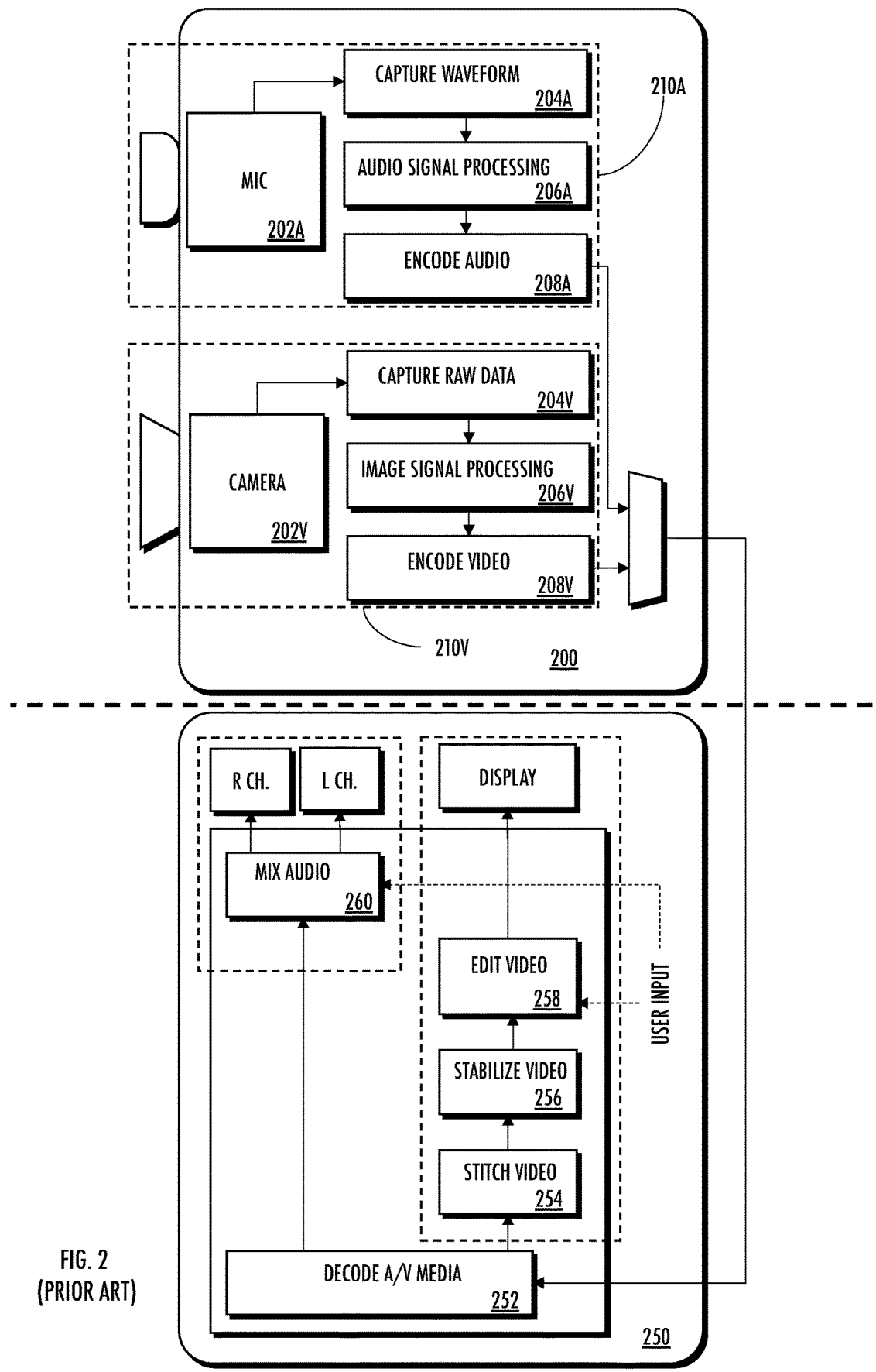
FIG. 2 is a block diagram of a traditional media ecosystem, useful to illustrate various aspects of the present disclosure.

FIG. 2 presents a logical block diagram of a traditional media ecosystem, useful to illustrate various aspects of the present disclosure. The media system includes: a camera 200 that captures video and a post-processing apparatus 250 that renders the media for playback. While the illustrated camera 200 combines both audio and visual subsystems (210A, 210V), other implementations may capture audio and visual media separately.

The exemplary camera 200 includes one or more camera sensors 202V and microphones 202A. The raw sensor data is captured and pre-processed into audio/visual data. For example, image sensor data that is captured in RAW format (logic 204V) may be pre-processed by an image signal processor (ISP) 206V that filters and demosaics RAW data based on the cameras' exposure and shutter parameters (e.g., contrast, white balance, coloration, etc.). The resulting visual tracks may be encoded as a sequence of video frames (logic 208V). Similarly, microphone transducer data may be captured, and pre-processed (e.g., filtering, echo cancelation, noise reduction, etc.) before being encoded as audio tracks (204A, 206A, 208A). The encoded audio and video tracks may be jointly or separately encoded within A/V media formats for transport (e.g., JPEG, MPEG, etc.).

The exemplary post-processing apparatus 250 may be e.g., a smart phone, tablet, laptop, desktop, or even a server array. The post-processing apparatus 250 decodes the A/V transport format (logic 252). For systems that use multiple cameras, the resulting image data may be stitched together; stitching logic 254 often must blend or otherwise visually compensate for differences in camera sensor settings and exposure settings as well as viewpoint (e.g., parallax, etc.) Additionally, the post-processing apparatus 250 may include logic to stabilize video 256. Thereafter, the user may edit the video 258 (cropping to the desired framing, adjustments to color, etc.) and/or overlay various visualizations. Separately, the user may mix the audio using mixer logic 260 to achieve the desired audio effects. Mixing logic 260 may be used to adjust left, right, front, back channels, add additional audio tracks, add/remove echoes, and/or amplify/attenuate various frequency ranges. Audio modifications can create the illusion of space based on acoustics (e.g., a small room, a large concert hall, etc.)

Notably, the traditional media system handles audio and visual components separately. Video edits do not affect audio mixing, and vice versa. Moreover, due to the differences in processing complexity in video and audio, video replay is often batched as a high throughput long latency process whereas audio replay may be rendered just-in-time. The video/audio processing mismatch may prevent on-the-fly changes to media; this is typically not an issue for cinema type applications but can be a limitation for real-time and streaming applications (e.g., video games, internet media, medical and/or industrial applications). More generally, the existing post-processing paradigm is designed for cinema professionals that seek to maximize directorial control. This flexibility relies on human subjective input to create an overall aesthetic representation.

Anecdotally, consumer expectations are strongly influenced by professionally produced movies. Traditional cinematography is based on the theater experience where the audience passively receives the director's artistic vision. An auteur's shot selection may be carefully orchestrated so as to draw the audience's attention to objects of interest and/or to avoid or obscure the practical aspects of stagecraft. Action may be carefully choreographed, and audio may be orchestrated to achieve various desired artistic effects. Over the decades, popular cinema has cultivated an unspoken "cinematic language" in film; modern cinematographers manipulate sounds and imagery to achieve very specific effects. For example, Quentin Tarantino's films often stage wide shots and extreme close-ups to accentuate his signature campy violence; he also makes liberal use of crash zooms. As other such examples, Wes Anderson has distinctive color palettes and shot framing that convey an eclectic range of emotion, and Stanley Kubrik was famous for his eerie manipulation of one-point perspective.

The Assignee hereof has cultivated and acquired commercial recognition for its own unique style of cinematography. For example, the characteristic lens polynomial used in action cameras manufactured by the Assignee (such as the GoPro HERO™) has been consistently and exclusively used over multiple device generations. Additionally, years of branding investment and multimedia have cemented an association between the Assignee's distinctive "point-of-view" style and its action cameras within the consuming public.

The existing tools and post-processing ecosystems cater to a small set of power users and are not well suited for use and viewing by the general public. As previously noted, raw (unedited) action camera footage often lacks the production values that consumers desire. Action happens where and when it occurs; in most situations, it cannot be staged or re-shot. Further exacerbating matters, when action does occur, the camera may not be pointed in the right direction; audio may be muffled, distant, and (in some cases) drowned out by undesirable sounds.

To these ends, new tools are needed to enable everyday consumers to create compelling narratives from their raw action camera footage.

Exemplary Apparatus—

Figure 3A:
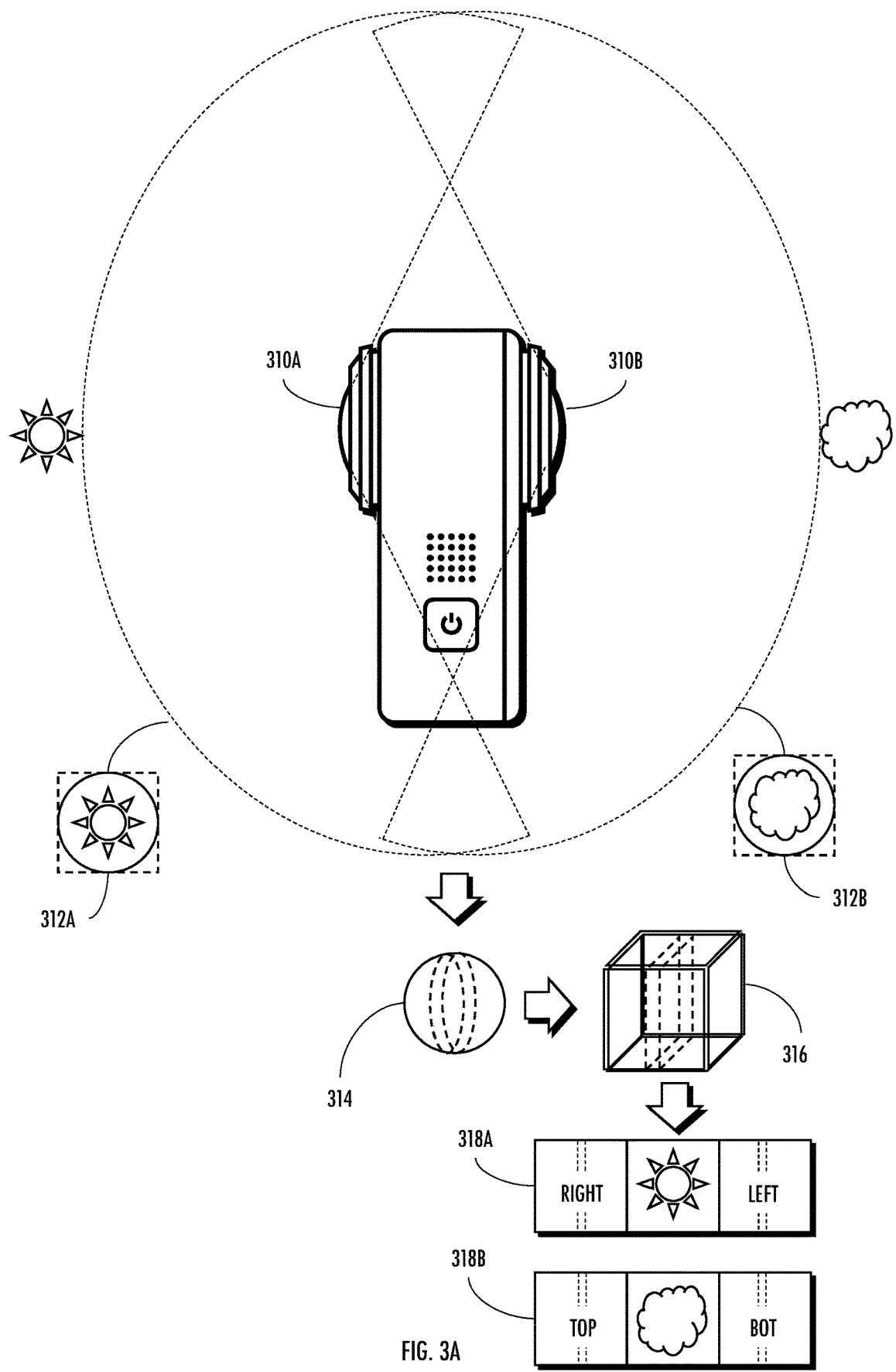
FIG. 3A is a graphical illustration of an exemplary action camera capturing a 360° panoramic image, useful in accordance with various aspects of the present disclosure.

FIG. 3A is a graphical illustration of an exemplary action camera capturing a 360° panoramic image. During operation, the first camera 310A captures a first fisheye image 312A and a second camera 310B captures a second fisheye image 312B. In the illustrated embodiment, the fisheye images 312A, 312B are hyper-hemispherical images that overlap (e.g., by 10° degrees). These overlapping regions may be used for blending and/or image stitching. The fisheye image data 312A, 312B may be roughly stitched "in-camera" into two (2) hemispheres of a spherical projection 314. Artisans of ordinary skill in the related arts will readily appreciate that stitching in-camera uses the overlapping image data between the two (2) original images in order to generate the two (2) hemispheres of the spherical projection 314. Stitching combines the fisheye images to ideally produce an imperceptible (or minimally perceptible) transition between the two (2) hemispheres of the spherical projection 314. Image stitching techniques commonly include e.g., edge detection, motion detection, parallax correction, perspective warping, etc. As shown in FIG. 3A, the overlapping image data may be retained for post-processing.

The spherical projection 314 is converted into an equiangular cubemap (EAC) projection 316 with retained overlapping image data. The EAC projection may entail warping the fisheye data according to the ideal mathematical relationship between the spherical projection and the EAC projection. Subsequently thereafter, the EAC projection 316 with retained overlapping image data may in one approach be divided into front, back, left, right, top, and bottom portions, wherein each portion represents image data from corresponding fields of view from the two fisheye cameras. For example, the front portion of the spherical projection corresponds to image data from the center of fisheye image 312A. The back portion of the spherical projection corresponds to image data from the center of fisheye image 312B. The top portion of the spherical projection corresponds to image data stitched together from the top parts of the front and back fisheye images 312A/312B. The left, right, and bottom portions of the spherical projection are similarly collected from their corresponding images.

The front, back, left, right, top, and bottom portions of the fisheye image data are mapped onto corresponding front, back, left, right, top, and bottom facets of the EAC projection. In one exemplary embodiment, the EAC projection 316 with retained overlapping image data can be split into a first image segment 318A (corresponding to the right, front, and left facets), and a second image segment 318B (corresponding to the top, back, and bottom facets). Notably, the exemplary partitioning ensures that each facet represents a continuous image (e.g., right and back facets share an edge), which may improve compression and/or reduce compression artifacts caused by image discontinuities.

While the present disclosure is discussed in the context of EAC, any rectangular format may be substituted with equal success. For instance, in one exemplary variant, the multi-band algorithm may be applied on an equi-rectangular projection (ERP). Due to the differences in pixel information density of ERP (versus EAC) and the potentially lossy/noisy nature of stitching, ERP projections may further benefit from additional manipulations. As but one such example, an ERP projection can be rotated such that the "stitch line" runs horizontally through the center of the ERP (where the ERP is least distorted). Minimizing image distortions along the stitch line reduces stitching complexity and/or reduces the possibility of introducing undesirable stitching artifacts.

Figure 3B:
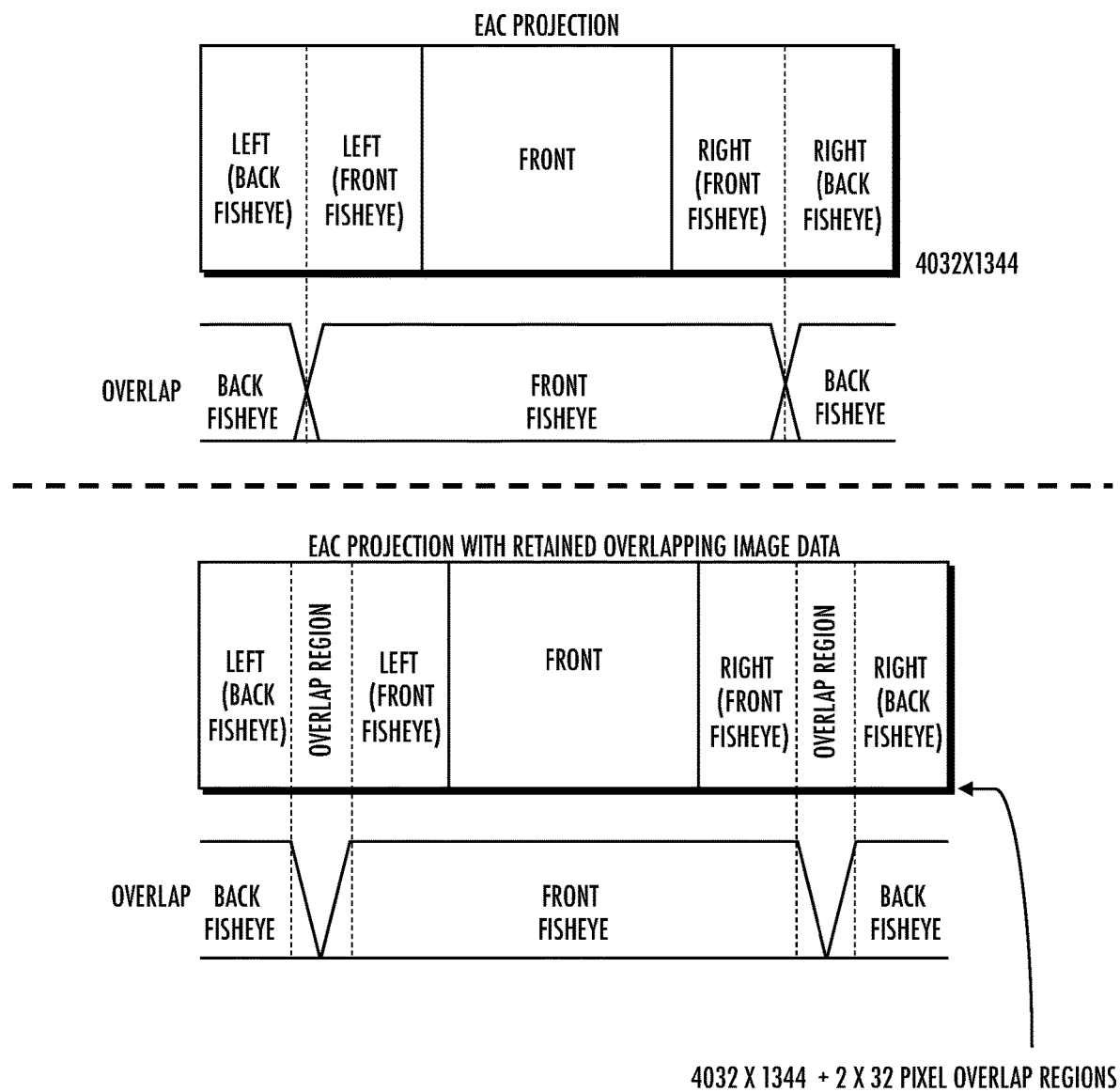
FIG. 3B provides a graphical illustration that illustrates the structural differences between a traditional EAC projection, and the exemplary EAC projection with retained overlapping image data, useful in accordance with various aspects of the present disclosure.

FIG. 3B provides a graphical illustration that illustrates the structural differences between a traditional EAC projection, and the exemplary EAC projection with retained overlapping image data. As shown therein, a traditional EAC data structure uses the image stitching information to blend image data from the front and back fisheyes at the transition point. In contrast, the exemplary EAC projection with retained overlapping image data has been stitched but preserves both sides of the overlapping data.

As a brief aside, encoding and decoding of audio/visual (A/V) media can be handled via either software emulation, or in dedicated hardware circuits. Hardware codecs are composed of physical logic and sequential components; thus, hardware codecs have hard limitations on the amount of data that they can process (e.g., throughput) and the size of data they can handle (e.g., row and/or column buffer sizes). For example, most existing hardware codecs that comply with High Efficiency Video Coding (HEVC) Level 5.1 include hardware components that accept pixel line widths up to (but not exceeding) 4096 pixels (and/or pixel column depths up to 2160 pixels). In contrast, software-based codecs can be useful where the A/V media is of unusual size/frame rate or has non-standardized features. Unfortunately, software-based codec operation logically emulates hardware with arithmetic operations which consumes processing resources and is much slower (e.g., 50×). In the illustrated embodiment of FIG. 3B, an EAC that uses 1344×1344 cube faces can be split into two (2) image segments of 4032×1344 that include 2 overlap bands (of 32 pixels width). The modified EAC data structure fits within the hardware limitations of most HEVC 5.1 commodity codecs (4096×1344).

Figure 4:
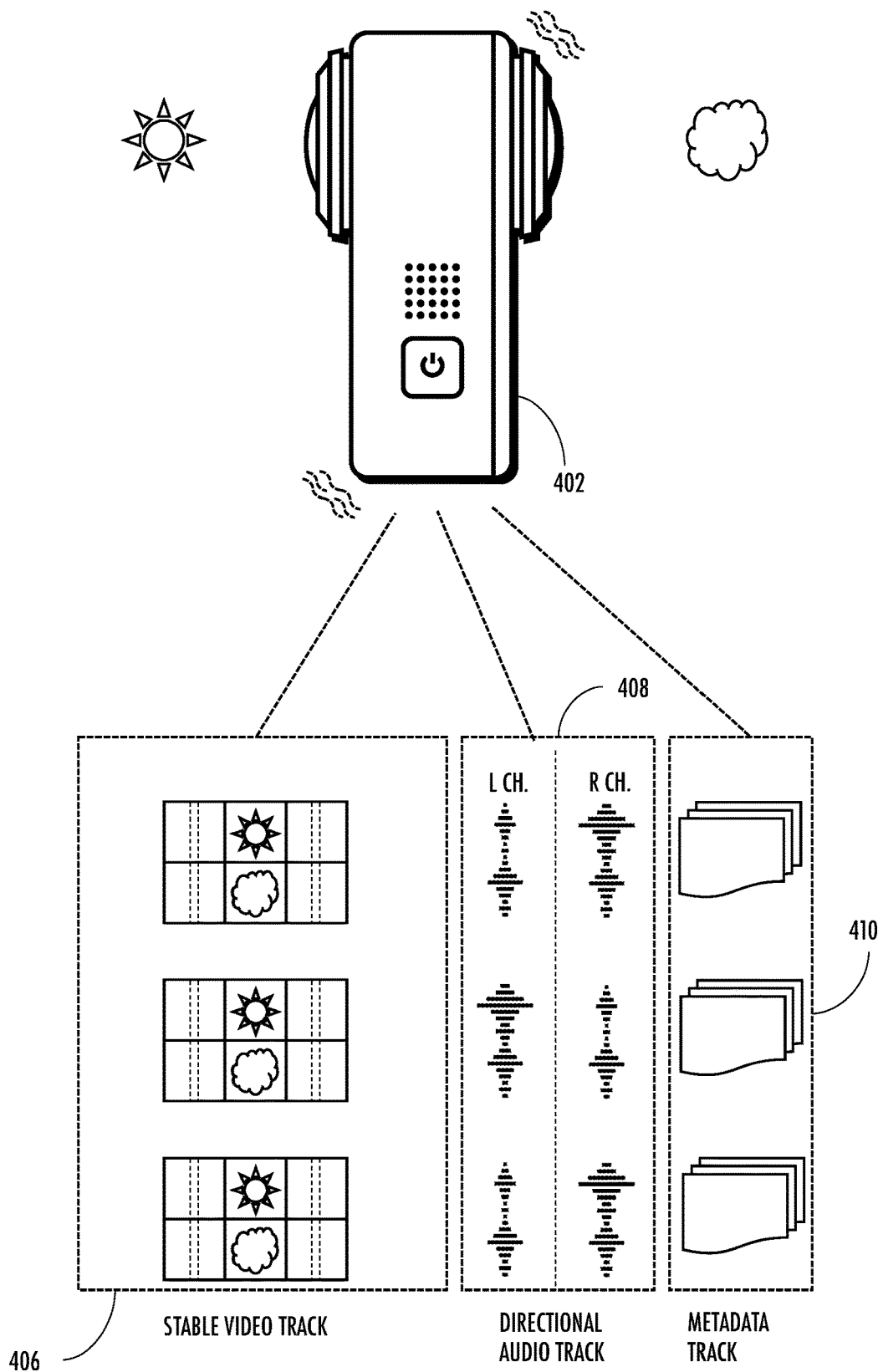
FIG. 4 is a graphical representation of an action camera capturing footage, in accordance with various aspects of the present disclosure.

FIG. 4 is a graphical representation of an action camera capturing footage, useful to illustrate various aspects of the present disclosure. As shown therein, the action camera 402 captures a complete 360° panoramic video 406. Even though the action camera is handheld and shaky, the exemplary action camera 402 is designed to stitch and stabilize the resulting video 406, as described supra. Audio 408 may be captured by directional microphones that are mounted to the chassis.

As an important observation, the exemplary action camera continuously records a variety of metadata (such as instantaneous metadata 410) during capture to correct for the nature of its operation. Unlike existing A/V metadata that is largely organizational in nature (e.g., author name, time of capture, location of capture, etc.), instantaneous metadata 410 generally describes other aspects such as shooting conditions at a specific moment in time (e.g., on a frame-by-frame or even row-by-row/column-by-column basis). For example, an exemplary action camera records its current rotation and acceleration to sub-pixel accuracy for every image. Additionally, camera sensors automatically adjust for differences in lighting in each frame. In some implementations, certain types of subject detection may also be used by the camera; for instance, facial recognition may be used to automatically focus settings, object distance may be collected by proximity sensors and stored within a "warp track" to assist in stitching and parallax compensation, etc. Hence, the term "metadata" as used herein refers generally to data which is additional to the primary video and/or audio content being captured, and includes without limitation the exemplary species of instantaneous metadata, examples of the latter which are described above.

Figure 5:
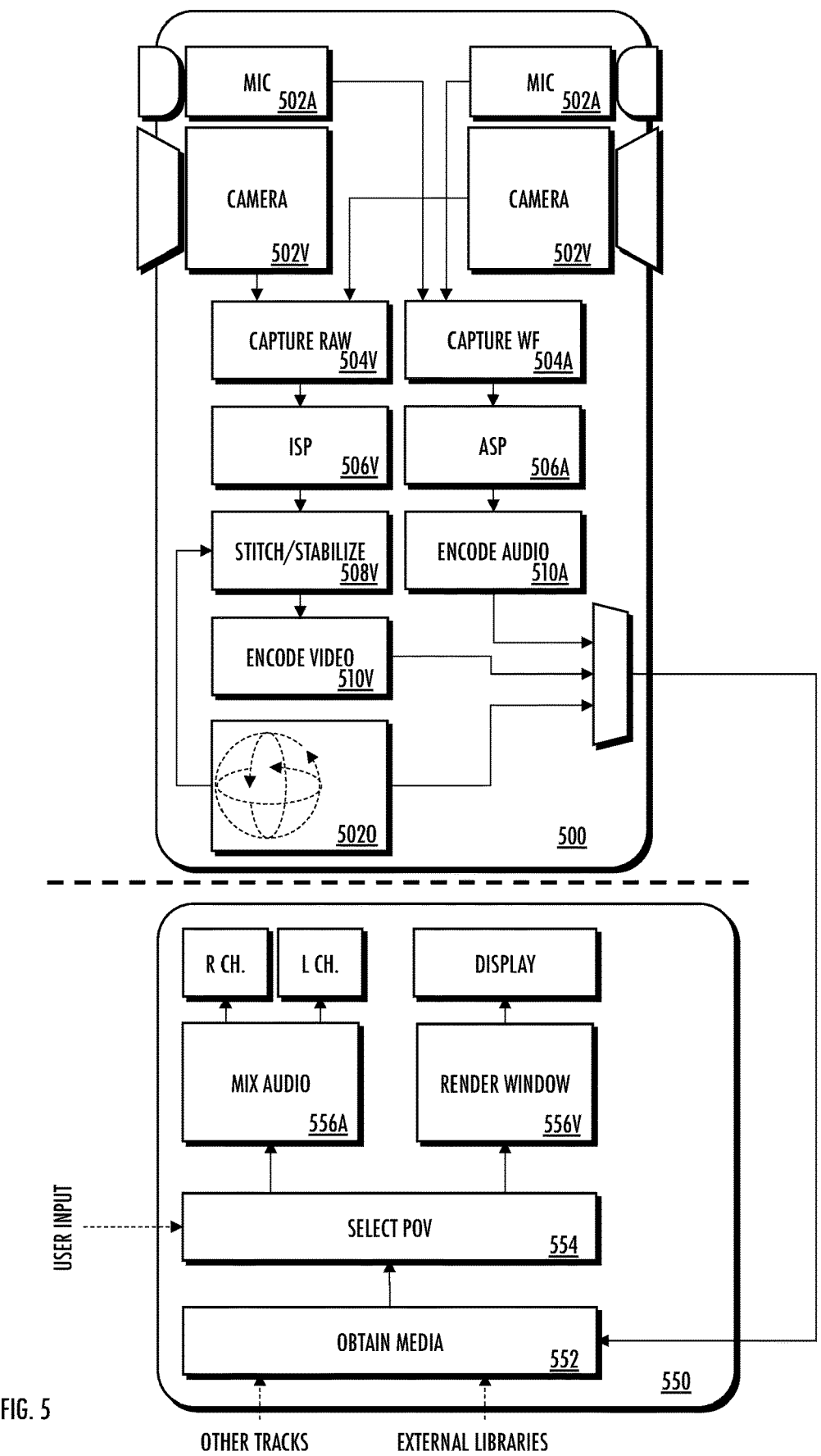
FIG. 5 is a functional block diagram of an exemplary embodiment of a media system, in accordance with various aspects of the present disclosure.

FIG. 5 presents a block diagram of an exemplary media system, useful to illustrate various aspects of the present disclosure. The media system includes: an action camera 500 that captures video and a post-processing apparatus 550 that renders the media for playback. As shown in FIG. 5, the exemplary camera 500 includes one or more camera sensors 502V and microphones 502A. As with normal camera operation, audio and visual data is captured and pre-processed (502A/502V, 504A/504V, 506A/506V). However, unlike traditional cameras, the action camera 500 incorporates a variety of onboard sensors to assist with in-camera processing.

In the illustrated embodiment, the camera includes an inertial measurement unit (IMU) (502O) that determines the camera's orientation, velocity, and acceleration. Notably, the camera's spatial data can be locally used in-camera to assist in stabilization and stitching (508V). For example, as discussed with respect to the exemplary methods and apparatus described in U.S. patent application Ser. No. 16/503,320 filed Jul. 3, 2019 and entitled "APPARATUS AND METHODS FOR PRE-PROCESSING AND STABILIZATION OF CAPTURED IMAGE DATA," incorporated herein by reference in its entirety, pre-processing image data may enhance the quality of subsequent encoding and rendering. As described therein, stitching of image data from two or more sensors facilitates stabilization and advantageously removes apparent object movement. Other benefits include improved compression quality (both in the output image as well as the overall data structure size).

In one exemplary embodiment, the audio 510A and video 510V are provided to the post-processing apparatus 550 along with other recorded instantaneous metadata (e.g., lighting, exposure, aperture, velocity, acceleration, orientation, etc.). In one implementation, the tracks are provided together within a common data structure; for example, via a multi-track MPEG file. Common data structures may share a synchronization mechanism; typical examples of such mechanisms include e.g., a shared time base for timestamps, a pre-defined increments (e.g., per frame), and shared reference events (e.g., data captured according to a rising edge, a global clock, etc.). In other implementations, the tracks may be separately captured and provided via disparate data structures. In certain variants, the tracks may be re-synchronized or otherwise aligned during post-processing (described infra).

The exemplary post-processing apparatus 550 may be e.g., a smart phone, tablet, laptop, desktop, server array, etc. The post-processing apparatus 550 obtains a variety of tracks (logic 552). The tracks may include common and/or disparate media, metadata, instantaneous metadata, media libraries, etc. The tracks may need to be decoded, retrieved, generated, translated, converted, or otherwise made available for use. In some cases, "informative" instantaneous metadata may be also be gathered and used to infer world characteristics. Informative instantaneous metadata may be relevant even if it is not directly reproduced. Such data may tolerate erroneous and/or incomplete capture. As but one such example, accelerometer data may be used to infer translational movement and user activity. Even though acceleration doesn't directly measure positioning, it can provide helpful insight for post-processing analysis. As but another such example, engine RPM data does not directly measure a vehicle's motion, but may be used to pipe in studio engine noise, etc.

In one exemplary embodiment, the post-processing apparatus 550 may obtain data from many different devices. For example, multiple action cameras may be networked together to catch different vantage points of the same event. More generally, any device may be used to capture media and/or instantaneous metadata. For example, an action camera 500 may capture footage while mounted to a car; the car may also have a tachometer that produces instantaneous metadata in the form of revolutions per minute (RPM) data or other vehicle information during capture. As but another example, an action camera 500 may capture footage while mounted to a user; the user may also have a heart rate monitor that produces instantaneous metadata in the form of beats per minute (BPM) data. Other examples of biophysical information from a human may include e.g., heart rate data, blood oxygenation, etc.

In multi-device capture, certain tracks may need to be aligned to a common time base; for example, a video, audio, and instantaneous metadata track may need to be synchronized. In some cases, time alignment may require a search window; for example, a shorter track may only need to be aligned within a small window of a longer track timeline, etc. In still other cases, alignment may tolerate some error. For example, informative track alignment may be based on completeness and/or relevancy; in some cases, informative track alignment may also be flagged as being potentially too incomplete, or error prone to be used.

In some cases, the post-processing apparatus 550 may need to generate a common time base to align multiple capture devices. For example, data captured via an action camera 500 may need to be synchronized with an engine's RPM count from a tachometer, or heart rate monitor's beat per minute (BPM). In some cases, the devices may have differences in time base and/or the observed passage of time, thus the tracks may be re-synchronized based on commonly observed events (e.g., a beacon) or adjusted based on heuristics, manual tuning, etc. In other variants, the tracks may be informative for replacement media; for example, an actual engine's RPM may be used to splice in engine sounds that were captured under studio conditions.

During exemplary post-processing, the user may provide point-of-view (POV) input (logic 554) and subsequently the corresponding media streams (logic 556A, 556V) are reconstructed based on the selected POV. In one exemplary implementation, the instantaneous camera's IMU data (from 502O) is compared to the user's selected POV. The 360° panorama is rotated and cropped to render a window for display based on the differences in actual and desired positioning. In addition, velocity and acceleration data may be used to accentuate or attenuate correction (e.g., overdamping or underdamping the POV window's apparent movement may affect the perception of motion).

Similarly, right and left audio tracks may be mixed to correct directional audio to match the direction of the rendered window (logic 556A). For example, if the video window is cropped to the left of the front camera, the left audio channel may be amplified, and the right channel may be attenuated, etc. More sophisticated audio implementations may construct a three-dimensional audio landscape from the originally captured audio, and mix audio according to the selected POV. Thus, a rearview projection may switch left and right channels, etc.

While the illustrated system combines both audio and visual subsystems, the various aspects of the present disclosure may be broadly extended to any consolidation, division, distribution, agglomeration, and/or combination of sensing devices. Virtually any number of devices that may be networked together to provide a myriad of information that can be used for metadata-based cinematography, production effects, shot selection, and/or other content augmentation described hereinafter.

Exemplary POV Cinematography—

Instantaneous metadata may be treated as the camera's experiential data. While such metadata does not have any current use in the existing cinematic post-processing ecosystem, the exemplary embodiments described herein leverage instantaneous metadata to heighten point-of-view (POV) cinematography. Unlike traditional post-production tools that allow a professional to splice and combine many different media tracks according to their own subjective (human) judgement, the exemplary point-of-view (POV) videography described herein is focused on recreating a cohesive and/or immersive experience from the camera's experiential data.

In one exemplary embodiment, post-processing adjustments to one media may automatically trigger adjustments to another media consistent with an immersive experience. For example, visually cropping a 360° panorama to focus on a particular window of action may automatically cause the audio tracks to be re-mixed based on the action camera's instantaneous orientation metadata. Aligning the visual and audio modalities of the media ensures that the audience can have a spatially immersive "seeing and hearing" experience.

More generally, the term "immersive" refers to media that includes multiple sensory modalities from a common temporal or spatial coordinate (e.g., point-of-view and/or time-of-view). Immersive media plunges the viewer back into the lived-in experience by exciting multiple senses or modalities of expression, as if the viewer were re-living the experience. Traditional post-processing techniques rely on the director to create the immersive experience by e.g., subjectively tuning the tracks based on their own perception. However, subjective tuning is only as good as the director's ability.

Advantageously, the foregoing instantaneous metadata-based approach uses the camera's experiential data rather than subjective human perception. In other words, the tracks may be automatically adjusted based on the mathematical differences between the camera's physical orientation and a desired point-of-view for presentation. More generally, rather than relying on subjective human perception, the various aspects of the present disclosure enable objective instantaneous metadata-based adjustment to media. Objective adjustments may be automated and performed on-the-fly according to well-defined heuristics. For example, an audio track can be dynamically adjusted based on the video cropping and acoustic modeling.

In a related but distinct concept, traditional limitations of audio and visual media have required that directors symbolically represent certain concepts audibly and/or visually. For example, velocity and acceleration (tactile sensation) may be represented with motion blur and/or doppler shift. Similarly, titling and/or text movement may be "anchored" or related to subject movement in the visual media. As used herein, the term "cohesive" refers to media modifications that link captured media to an intended aesthetic experience for the audience; cohesive modifications may augment or replace the recorded media according to formalized rules, etc.

In one exemplary embodiment, post-processing adjustments to multiple media types may be cohesively adjusted based on instantaneous metadata. For example, instantaneous metadata from e.g., a heart rate monitor may be used to add both visualizations (motion blur) and augmented audio (heartbeats) when needed. As another such example, a virtual or physically measured engine's revolutions per minute (RPM) can be used to simultaneously add an RPM visualization and engine noise. Ideally, cohesive augmentations add to the visual and/or audio experience, without detracting from the experience.

Notably, cohesive modifications to media directly benefit from the aforementioned instantaneous metadata-based techniques. Cohesive augmentation (e.g., visualizations, audible augmentation ("audibilizations"), haptic augmentation ("haptifications"), etc.) may be automatically added to the media track on-the-fly based on instantaneous metadata. Such augmentations may further add to the richness and/or artistry of POV cinema.

More generally, various aspects of the present disclosure are directed to rendering media based on instantaneous metadata. Unlike traditional post-processing techniques that rely on human subjectivity, point-of-view (POV) cinematography can use data driven analysis to re-create a "lived-in" experience. The various techniques described supra leverage the camera's actual experiential data to enable cinema-quality post-processing for the general consuming public.

Exemplary Shot Selection Advisory—

Various aspects of the present disclosure are directed to instantaneous metadata-based cinematography and/or shot selection. Many of the cinematic elements of the language are a function of shot selection. Thus, various embodiments use instantaneous metadata to identify when camera movement (or other sensor activity) can be translated into elements of the cinematic language.

As a brief aside, shot selection refers generally to any combination of shot size, shot framing, camera movement, camera mechanisms, depth of field, etc. Notably, 360° panoramic action cameras can be used to create many different dynamic shots from a single captured media track. The lack of a defined "camera frame" allows for a variety of different shot sizes; for example, a full panoramic shot can be statically cropped as e.g., a "wide shot" (a human subject does not fill the image), a "full shot" (a human subject fills the image), a "medium shot" (a human subject from waist up), a "close up shot" (e.g., a human subject's face), etc.

Similarly, action cameras provide much more flexibility in dynamic shots. As but one example, an action camera that is translationally moving in a first direction (a "dolly shot") is also simultaneously panning in the transaxial direction (a "crab shot"). Moreover, a full 360° panoramic shot can be dynamically cropped to certain panning effects e.g., a "whip pan", a "tilt pan", "tracking shots" (e.g., the cropping is based on a moving subject), etc. Certain hybrid camera shots may be created in post-processing using image manipulation. For example, a "dolly zoom" may combine motion toward the subject with a zoom in the opposite direction; e.g., the subject remains approximately the same size in the frame while the background FOV changes (imparting a "vertigo effect"). This effect may be achieved by detecting movement toward a subject and adding a counter zoom or using a lens projection to simulate camera movement (a change to FOV) and adding a counter zoom. A myriad of other shots are commonly used in the theater arts, the foregoing being purely illustrative.

In one exemplary embodiment, shot selection can be inferred based on instantaneous rotation and acceleration of an action camera. For example, a camera that is held substantially still may generate image data for static shots. A camera that is undergoing translational and/or rotational movement may generate shot selection data for pan shots. In some cases, suitable shot selection can be inferred based on instantaneous content detection. For example, facial detection data may be used to identify shot framing for one, two, three, etc. subjects. Similarly, horizon detection data may be useful to identify shots that are suitable for wide shots. In some cases, detection data may be used to cull certain types of shots; for example, warp line information may identify portions of a video that suffer from parallax and may be problematic for certain uses (close-ups) but acceptable for others (motion blurred whip pans, etc.).

When combined with the existing corpus of cinematic language, metadata-based post-processing simplifies the creation of compelling narratives. As previously noted, most amateur filmmakers have internalized the language of cinema, but lack the knowledge and craft to recreate it. Even professional filmmakers often make artistic decisions through trial and error in post-capture edits, rather than at the time of shooting. Various embodiments use instantaneous metadata to focus the user's attention to portions of the media that may be suitable for scenes of a cinematic narrative, or that would likely heighten the audience's experience. By focusing the user's attention on the most likely points of interest, the user does not have to view (nor does a machine need to process) large portions of raw footage. This can be a substantial savings e.g., an eight-hour surf session may be condensed to a few choice opening shot selections (exposure metadata), various clips of action footage (based on camera orientation and movement), a brief interlude that focuses on two or three human faces (subject detection), and closing clips of the sunset (exposure metadata). Even at 4× replay speeds, a user is unlikely to watch 2 hours of replay; similarly, computer vision processing of media is far more complex than metadata indexing and filtering.

Figure 6:
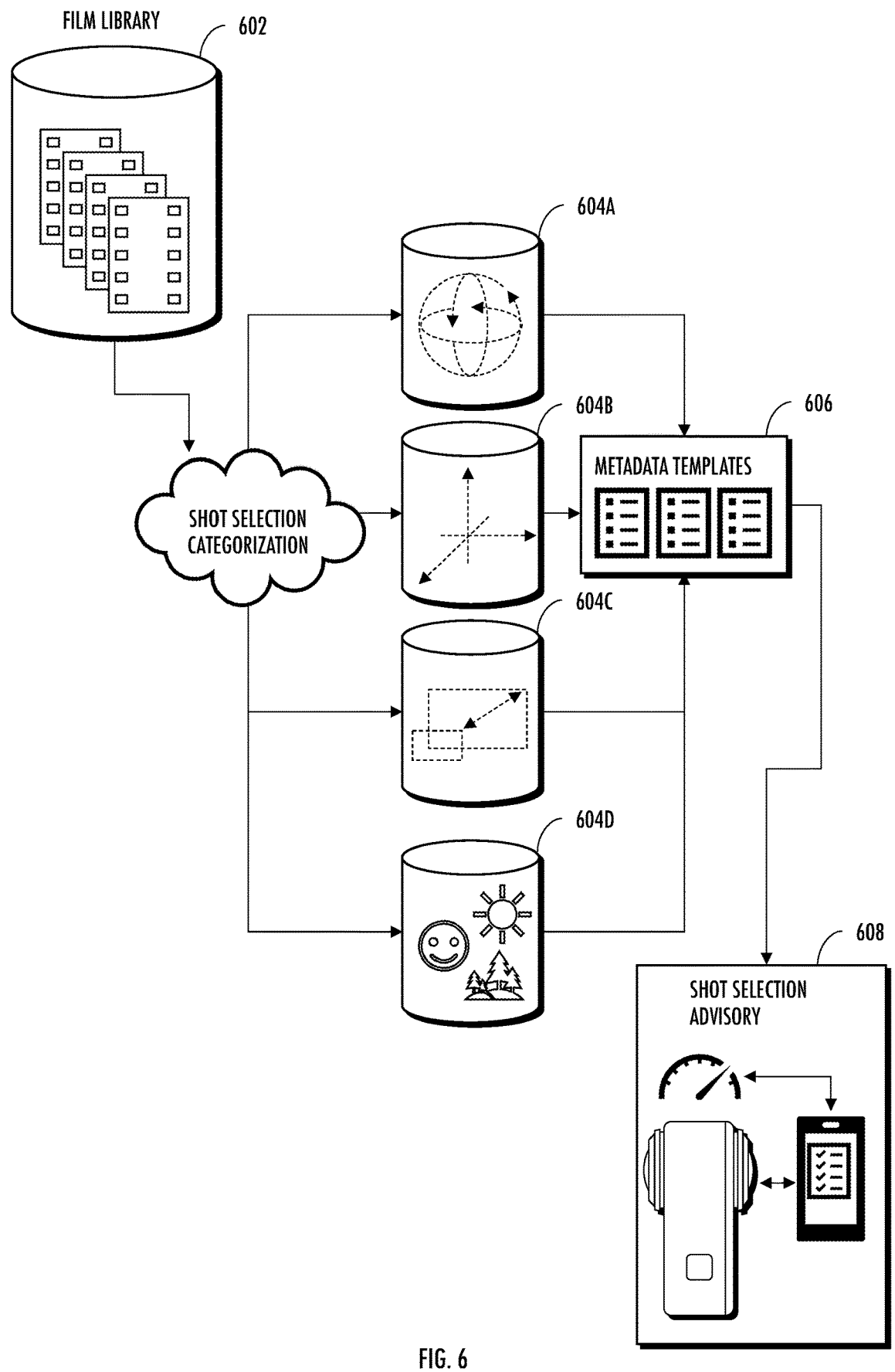
FIG. 6 is a graphical representation of an exemplary advisory architecture for shot selection, in accordance with various aspects of the present disclosure.

FIG. 6 is a graphical representation of an exemplary advisory architecture for shot selection, in accordance with various aspects of the present disclosure. As shown therein, a library of media 602 is categorized based on elements of cinematic language. For example, a library of the Assignee's distinctive "point-of-view" style advertisements and promotional materials may be analyzed and assigned different categories by e.g., users, professional videographers, or machine intelligence. In the illustrated embodiment, the media is categorized based on e.g., rotation 604A, translation 604B, and shot size 604C. For example, dolly shots and crab shots are translational camera movements 604B, whereas whip pans and tilt pans correspond to camera rotations 604A. Different shot sizes (wide, full, medium, close up) may correspond to different camera zoom 604C. Similarly, subject detection (e.g., facial recognition, landscape, lens flare, etc.) may be categorized 604D. Virtually any type of cinematic element may be included; for example, visualizations, audibilizations, haptifications, etc. may also be catalogued.

While the discussion is presented in the context of the Assignee's materials, any source may be substituted with equal success. In some cases, the media may be based on film auteur (e.g., Tarantino, Anderson, Kubrik, etc.); in other cases, the media may be based on type (e.g., action, horror, comedy, drama, etc.). Furthermore, the techniques described herein may broadly encompass any source media. Illustrative examples of the breadth of source materials include without limitation: advertisements, video games, music, theater, cartoons, animations, fine arts, etc. In some cases, the library may be specific to a user or other intended audience; e.g., a user may select a body of material that is specific to their aesthetic desires. In other words, virtually any collection and/or organization of source media may be substituted with equal success by artisans of ordinary skill in the related arts.

Referring back to FIG. 6, once the library has been categorized into elements of cinematic language, instantaneous metadata templates 606 can be generated for one or more capture devices. Translation may be required due to differences between the source material and the capture device(s) capabilities. For example, an action camera that is translationally moving in a first direction (a "dolly shot") is also simultaneously panning in the transaxial direction (a "crab shot"). As but another example, a full 360° panoramic shot can be dynamically cropped to achieve certain panning effects e.g., a "whip pan", a "tilt pan", "tracking shots" (e.g., the cropping is based on a moving subject), etc. Similarly, an action camera that can be connected to a tachometer or heart rate monitor may provide instantaneous metadata that could be used for e.g., engine or heart rate visualizations, audibilizations, haptifications, etc.

In one exemplary embodiment, the instantaneous metadata templates can be used within one or more devices as a shot selection advisory 608. For example, a mobile device can connect to an action camera and a tachometer to capture raw footage. The mobile device uses the advisory to check for instantaneous metadata template modeled after racing cinema (e.g., Ford v. Ferrari). The applicable portions of the template are provided to the action camera and the tachometer. For example, the action camera may have a checklist of rotations, translations, and features to catch, similarly, the tachometer may need to specific acceleration and/or deceleration profiles. The mobile device can provide a dynamic status to the user; in this way, the user can immediately determine what additional source material needs to be collected. By providing a dynamic advisory at the time of capture, the user can make sure they have caught all the footage they need before they end their shooting session.

In a related exemplary embodiment, instantaneous metadata templates can also be used during post-processing to quickly organize media after the fact. For example, consider a user that just started recording media with an action camera without any specific intent. Throughout the recording session, the action camera may acquire a variety of different footage through random movement and/or activity. In some cases, the captured footage may actually support many different potential narratives. For example, perhaps unbeknownst to the user, the camera may have caught a shark swimming nearby during a surf session; the user may choose to construct a gripping shark sighting narrative, a calm surf session, or potentially both, entirely in post.

More generally, the various principles described herein, inter alia, enable a user to retell their lived-in experiences in a similar style to selected thematic exemplars. The instantaneous metadata templates provide a cinematic language and structure that can be used to assemble media from a wide variety of base material. The user can quickly compose a short film based on the suggestions and the stylized template. In some cases, the user can use the suggestions as a starting point for more complex post-production; the user may fine tune suggestions, explore a broader range of scenes, and/or further tailor each scene to their particular aesthetic style. Ideally, focused shot selection and stylistic templates can enable both amateur and/or professional videographers to more easily create compelling narratives.

Methods

Figure 7A:
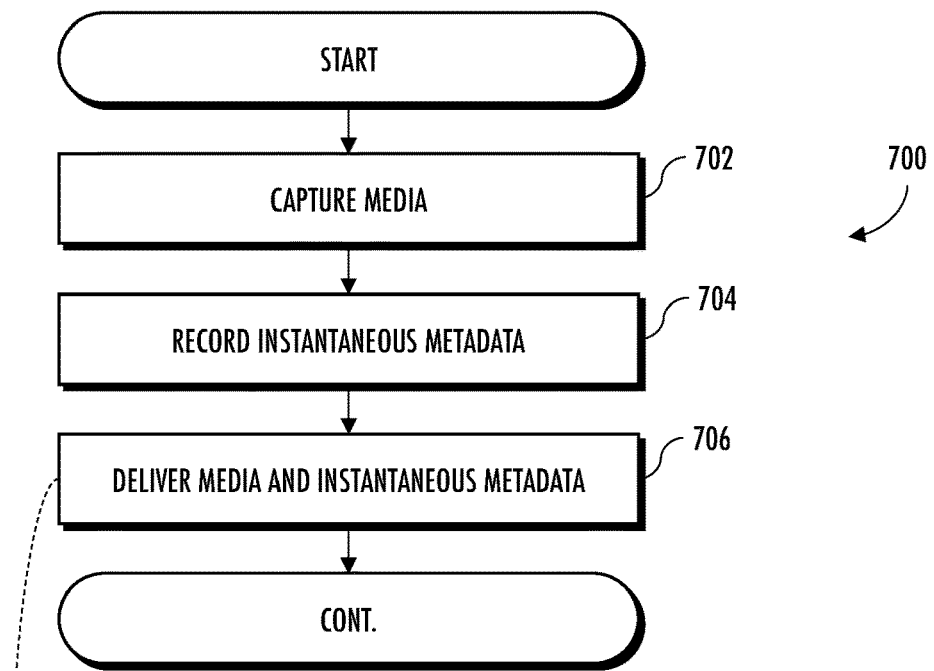
FIG. 7A is a logical flow diagram of a method for capturing instantaneous metadata for post-processing, in accordance with various aspects of the present disclosure.

FIG. 7A is a logical block diagram of a method 700 for capturing instantaneous metadata for post-processing.

At step 702 of the method 700, media is captured. In one exemplary embodiment, media is audio/visual (A/V) content which may be captured separately or together. For example, a camera may record both video and audio, etc. More generally, however, virtually any sensory experience that may be captured to media may be substituted with equal success. Examples of media include without limitation: visual media, audible media, tactile media, etc.

In one embodiment, one or more media are captured by one or more devices. In some cases, the one or more devices may be expressly synchronized via signaling (e.g., beacon, clock, etc.). In other cases, the one or more devices may be asynchronous, but recording the same sequence of events. Under such asynchronous variants, the recordings may be synchronized based on the observed sequence of events. For example, a helmet mounted camera and a hood mounted camera may both record the same engine sound; the engine sounds may be later used to synchronize the two different video streams.

Still other embodiments may not be captured at the same time or place but may be thematically similar and suitable for fungible use. As but one such example, a user may go surfing one day, but drone pilot the same beach another day.

The two separate footages may be sufficiently similar to enable a common narrative thread (e.g., what the user did on vacation).

The techniques described herein are not limited to media capture and may be broadly applied to media generation as well. For example, a user may capture actual race footage, but also generate computer generated wireframe models of an engine's internals during operation. Computer generated modeling may be widely used within industrial and/or medical applications. More generally, any scheme for media creation may be substituted with equal success by artisans of ordinary skill in the related arts. Additionally, the foregoing discussion is presented in the context of human perception, however the principles described herein are not so limited. For example, some sensors may sense electromagnetic radiation outside of the visible spectrum of light, or acoustic pressure waves that are outside the audible ranges of sound. Other sensing mechanisms may also be used; for example, LiDAR and RADAR may be used to determine distance.

At step 704 of the method 700, instantaneous metadata associated with the media is recorded. In one embodiment, instantaneous metadata may include a sensor's capture information. For example, a device's capture information may include inertial measurement unit (IMU) data (e.g., orientation, velocity, acceleration, etc.), temporal information (e.g., start time, end time, duration, passage of time, etc.), and/or other relevant environmental information. Different types of sensing modalities may also record a variety of capture information; for example, as previously noted, image sensors may record e.g., exposure, aperture, shutter speed, feature detection (e.g., facial recognition, QR code, lens flare, etc.). Analogously, audio sensors may record e.g., amplitude, directionality, distortion, ambient noise, and/or other acoustic data. More generally, any environmental factors that may be sensed, or that affect a sensor's capabilities may be recorded; such factors may include without limitation constructive/destructive interference, proximity, temperature, electromagnetic radiation, humidity, etc.

Pre-processing data that is performed by the device may be additionally recorded as instantaneous metadata. In one exemplary embodiment, an action camera records stitching information (e.g., parallax detection, stitching, stabilization, and/or other in-camera adjustments). Examples of audio pre-processing may include e.g., signal quality noise quality and/or variations thereof (signal to noise ratio, etc.), echo cancellation data, and/or beam forming (directional acoustics). More generally however, any device specific instantaneous pre-processing metadata may be subsequently reviewed by post-processing to e.g., further improve rendering, undo incorrect pre-processing, or otherwise inform subsequent presentation.

As used herein, the term "pre-processing" refers to operations performed by a capture device prior to encoding media for transport, storage, presentation, etc. In contrast, the term "post-processing" refers to operations performed by a rendering device on media after decoding, in preparation for presentation.

In one exemplary embodiment, instantaneous metadata is spatially and/or temporally associated with media capture. For example, instantaneous metadata may be captured with the media by the same device(s) at the same time and/or place. Notably, spatial and/or temporal association may span multiple devices; e.g., a car mounted camera may capture orientation, velocity, and acceleration, while a networked tachometer may measure the corresponding RPM.

In another exemplary embodiment, instantaneous metadata may enable thematic associations between separately captured media. For example, a car's engine performance and the car's racing footage are thematically related to the car; but due to practical constraints may be captured under different circumstances. Racing footage and engine RPM may be captured, however the car's engine noise may be recorded separately and spliced in based on the engine RPM. Notably, engine noise is a mechanical function of the engine's operation; even though humans cannot perceive differences between different revolutions, the overall "growl", "purr", "whine", etc. connotes information about the engine's performance. Cohesively tying engine noise to the mechanical RPM (the cause of the sound) is far more accurate than attempting to subjectively match a library of different engine noises to the racing footage.

In some variants, instantaneous metadata may be captured concurrently by nearby networked devices. In some such variants, instantaneous metadata may be streamed to the capture device at the time of capture (e.g., instantaneous RPM data from a networked tachometer may be provided to an action camera). In other variants, instantaneous metadata may be provided post-capture to the capture device; subsequent post-processing may enable content synchronization.

At step 706 of the method 700, media and instantaneous metadata are delivered. In one embodiment, the media and instantaneous metadata are delivered via a common data structure. For example, an action camera may encode audio, video, and inertial measurement unit (IMU) data within different tracks of an MPEG file. In other embodiments, the media and instantaneous metadata are delivered via different data structures. For example, an MPEG file may be used to deliver video, audio may be provided via an AAC file, and inertial data may be presented via the IMU data format. In some cases, media files may additionally be described with organizational metadata to assist with indexing and data retrieval.

In some variants, data files may be encoded for delivery. Encoding is often used to reduce bandwidth and/or deliver data over unreliable channels. Similarly, due to the personalized nature of certain types of data, media and/or instantaneous metadata may need to be encrypted for privacy and/or security.

In some variants, delivery may be performed post-capture. In other variants, delivery may be concurrent to capture (e.g., streaming). For example, an action camera can stream video, audio, and orientation data to a mobile device for post-processing while action is happening. This may be particularly useful where the camera's onboard user interface is unable to provide real-time feedback that the user can provide (e.g., adjustments to focus, light settings, object tracking, etc.).

While the discussion presented above generally assumes that the media is of interest (for the audience, etc.), artisans of ordinary skill in the related arts will readily appreciate that certain applications may actually value instantaneous metadata as much or more than the media itself. Anecdotally, certain types of post-processing may rely heavily on computer generated graphics and/or special effects. For example, captured media may merely serve as a backdrop for a point-of-view experience; virtual objects of interest may be computer generated from instantaneous metadata. This may enable, for example, augmented reality type capture; e.g., a user may interact with an object (e.g., an apple) in real life but substitute another object in post-processing (e.g., a human face). Notably, the instantaneous metadata may be used to generate the object based on objective mathematical modelling (e.g., virtual hair may glint and throw shadows according to actual lighting conditions, etc.) rather than subjective artistic rendering.

Figure 7B:
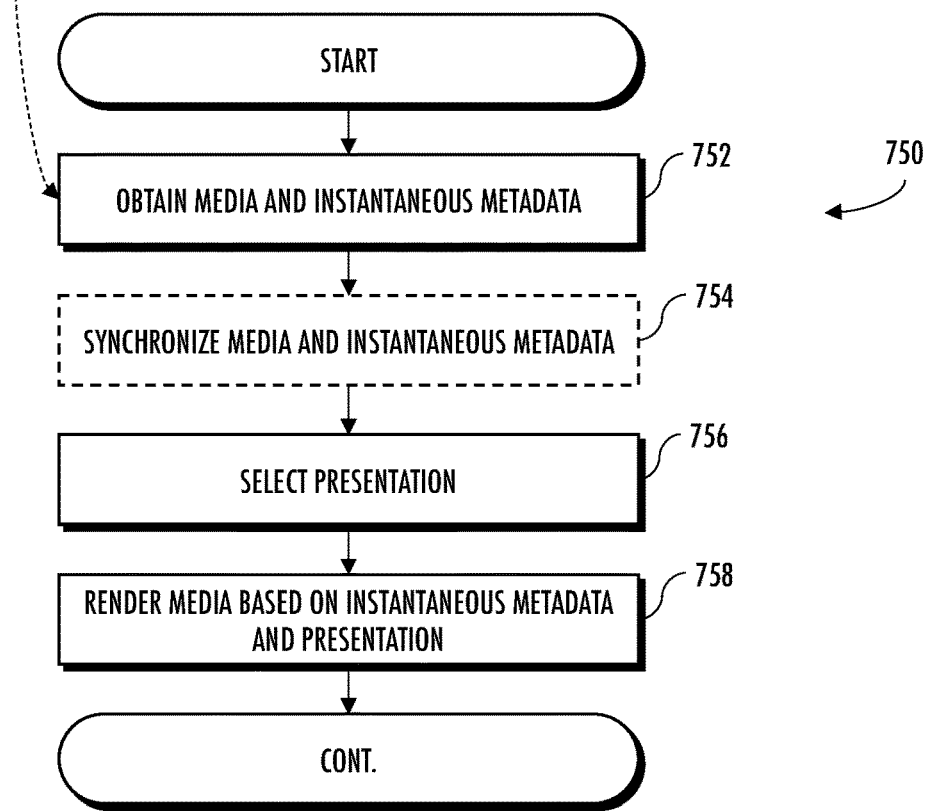
FIG. 7B is a logical flow diagram of a method for metadata-based cinematography, production effects, shot selection, and/or other content augmentation, in accordance with various aspects of the present disclosure.

FIG. 7B is a logical block diagram of a method 750 for metadata-based cinematography, production effects, shot selection, and/or other content augmentation.

At step 752 of the method 750, media and instantaneous metadata are obtained. In one exemplary embodiment, media and corresponding instantaneous metadata may be obtained from one or more capture devices (e.g., action cameras, microphones, tachometers, etc.). In some variants, the data may be obtained via a wired or wireless connection and decoded for post-processing. Other common techniques for data transfer may include e.g., retrieval from a memory card, direct memory access, etc.

In some embodiments, media and/or instantaneous metadata may be retrieved from thematically associated libraries; for example, a library of different engine noise recordings indexed according to RPM may be used to supply audio. As but another example, a library of engine recordings may be indexed according to IMU data; e.g., a car's IMU data through a banked turn can be used to pair appropriate engine noise. More generally, virtually any special effect (audible, visual or otherwise) that is thematically associated with media may be used consistent with the various principles described herein. For example, accelerometer data and light meter data can be mapped to horse hoof beats and thunderclaps from a "radio drama" media library, etc. Periodic motion (snowboard carving, etc.) may be tied to beats per minute of an accompanying music library for adding a soundtrack. Various other sources of thematically associated libraries may be readily substituted by artisans of ordinary skill, given the contents of the present disclosure.

More generally however, virtually any technique for acquiring, securing, gaining or otherwise attaining media and corresponding instantaneous metadata may be used consistent with the principles described herein. Advantageously, instantaneous metadata can be directly used for categorization, collection, and/or search algorithms. This may be particularly useful to discover post-processing techniques which a single user may not be aware of. In other words, a community of users that have arbitrarily captured footage may have unintentionally and/or unknowingly captured sufficient media to create compelling media. For example, the number of tourists that view Mendenhall Glacier every year is substantial, artists have manually compiled different pictures of Mendenhall Glacier to illustrate the effects of climate change to great effect. However, a similar presentation could be compiled from crowd-sourced instantaneous metadata (e.g., frame-by-frame location, time, lighting, etc.) for many different viewpoints; filtering in this manner does not require human labor, nor computationally expensive image recognition.

As but another example, a skier skiing down the ski slope may have not only their point-of-view (POV) action camera video, but they also have their instantaneous metadata location. Such information may be used to identify when the user passed through the periphery of a nearby snowboarder's action camera. Even though the snowboarder's action camera may have been used for something else, the passing image may be requested and used by the skier for their own media. Notably, the entire transaction can be handled on the basis of instantaneous metadata (the skier/snowboarder location, camera orientation, subject detection); in other words, instantaneous metadata can be used to quickly identify if the skier was within the snowboarder's proximity, and within frame at the expected orientation (not occluded or otherwise obscured). In addition to being more efficient than image recognition-based searching, metadata-based filtering may be particularly relevant for privacy considerations (e.g., the skier does not have access to the snowboarder's other captured media, and vice versa).

At step 754 of the method 750, media and instantaneous metadata may be aligned for processing and/or presentation. Media and instantaneous metadata may need to be aligned temporally, spatially, and/or thematically so as to construct or re-create an immersive and/or cohesive experience. More generally, any scheme for sequencing, arranging, and/or ordering media and/or instantaneous metadata with respect to one another may be broadly substituted with equal success.

In one exemplary embodiment, the media and/or instantaneous metadata may include time stamps and/or synchronization events (frame ticks, etc.) that can be used to coordinate the passage of time between different devices. For example, as previously alluded to, different devices may operate on slightly different time bases. A hood mounted action camera may capture AV media on its own clock, and a tachometer may capture engine RPM according to its own clock. Due to manufacturing and environmental differences between the devices, the camera and tachometer clocks may drift relative to one another. The relative drift between the two media tracks can be corrected, so as to ensure that e.g., the engine's noise and AV media are synchronized during playback.

As a related embodiment, the media and/or instantaneous metadata may include spatial data that can be used to compensate for relative movement between different devices. For example, two separately mounted cameras may have slight differences in mass and/or positioning that can create subtle differences in sensed data; e.g., a camera that is mounted on the hood of a car may experience slightly different conditions than a trunk mounted camera. Aligning the relative spatial movement between the two cameras can be used to compensate for unexpected differences which might be difficult to otherwise infer.

As previously alluded to, even though audio and video media may be played together, video is usually batched for processing, whereas audio is performed just-in-time. During post-processing, these tracks may be treated as different modalities of a common point-of-view experience rather than two unrelated data streams. While certain types of instantaneous metadata may be present in both modalities, they may need to be aligned differently depending on usage context. Duplicating and/or modifying instantaneous metadata for different presentation modalities can be used to decouple track modifications.

As but one such example, instantaneous metadata alignment may require interpolation between data points, or extrapolation to values outside of data points. For example, a video stream may be characterized by a particular frame rate (e.g., 24 frames per second) that is faster or slower than tachometer readings. Similarly, RPM data may need to be interpolated/extrapolated for audio frame rates (which may differ from video frame rates). Providing RPM data as both instantaneous metadata on each video and audio frame, ensures that modifications to one modality do not affect the other, and vice versa. For example, a streaming video from a hood mounted camera can dynamically overlay a visualization based on a video frame rate version of RPM; simultaneously, the streaming audio may alter engine noise based on an audio frame rate version of RPM.

While the foregoing alignment discussions are presented in the context of independently recorded instantaneous metadata, other schemes may be substituted with equal success. For example, multiple different devices may observe a common event (e.g., a beacon); the beacon may be used to measure the passage of time between devices indirectly. In another such example, a commonly observed beacon may be used to triangulate differences in device motion.

At step 756 of the method 750, a presentation is selected. In one embodiment, a user selects a point-of-view (POV) presentation. Any technique for defining how the media may be rendered, played, reproduced, distributed, performed, translated, duplicated, modified, or otherwise presented (in whole or in part) based on the instantaneous metadata may be used.

In one embodiment, the presentation is selected based on user interaction. In one such implementation, media is rendered based on a user's control. For example, a point-of-view presentation may be selected by default from a full resolution (or a preview resolution) of 360° panoramic content on a media device. Thereafter, the user may define a new point-of-view relative to the default presentation (e.g., by rotating and/or translating the view port to a new point of view). The view port corresponds to a subset (e.g., a non-wide-angle field of view) of the panoramic video content; corresponding directional audio for the media content is automatically mixed based on the instantaneous metadata (orientation, velocity, and/or acceleration of the panoramic video content). In one such implementation, the user may use a touch screen interface of the personal device to rotate and/or translate the view port. Other examples of user interfaces include without limitation: keyboards, mice, touchpads, gestured-based input, speech input, eye-tracking, etc.

In other embodiments, the presentation may be selected based on instantaneous metadata templates. Instantaneous metadata templates may be generated from a library of thematic exemplars. The instantaneous metadata identifies candidate media for presentation. For instance, a complete action camera recording (e.g., an eight-hour surf session) may have a variety of different potential scenes, based on instantaneous metadata associated with each frame of video. Depending on a user's selected instantaneous metadata template, the entire session may be quickly filtered to suggest a few choice shots. The choice shots may be presented to the user as a series of short video clips, a small preview thumbnail, or similar data structure handle. In order to sequence a film, the user selects and strings the shots together to specify how the final film should be rendered. In some cases, the user may additionally fine tune the individual shots. For example, a shot may be reframed, extended/reduced, augmented (e.g., with visualizations, audibilizations, haptifications, etc.) or otherwise modified.

In yet another embodiment, presentation may be selected based on instantaneous metadata associated with the media. For example, the capture device may identify a likely subject of interest in the image (based on face detection, etc.). The instantaneous metadata may be used to identify a default focus on the subject of interest, or to follow the subject of interest. Still other variants may enable computer assisted indexing and/or retrieval. For example, a user may search through the media library for any portions which match certain conditional statements. In this manner, a user may quickly winnow down a media clip to e.g., only shots where a subject was in frame, shot within a certain geofence, across different times, etc. More generally, virtually any searchable query may be executed based on instantaneous metadata.

While the foregoing discussion is presented in the context of a simplified user selection (e.g., for the consuming public), artisans of ordinary skill in the related arts will readily appreciate that the various techniques described herein may be broadly applied to more esoteric user interfaces and/or machine interfaces that may be used in specialized disciplines (e.g., industrial and/or medical fields). For example, computer numerically controlled (CNC) type devices often rely on mathematical modeling and/or descriptions to describe location and/or operation to a higher degree and/or precision that would be possible for a human. Similarly, computer applications for instantaneous metadata-based operation may not be limited to traditional human senses. As but one such example, an electron microscope may use metadata-based presentation to provide visualizations, audibilizations, and/or haptifications of objects at an atomic scale.

At step 758 of the method 750, the media is rendered based on the instantaneous metadata and presentation. While the foregoing discussion is primarily discussed in the context of media and instantaneous metadata for a single point-of-view entertainment, the various techniques described herein may be broadly extended to multiple points of view and/or applications beyond entertainment. For example, video games often make use of multiple point-of-view perspectives. In a virtual environment of a video game, the entire environment may be modeled and re-enacted from any and/or all of the viewpoints. Thus, for example, an audience may enjoy game replay based on their own preferences and recorded game history (e.g., common for e-sports, etc.). Other virtualized environments may be used for e.g., social networking, medical applications, and/or industrial applications. For example, social networking applications may share a common experience, but allow the audience to locally determine what to experience, how to experience it, etc. Similarly, medical and/or industrial applications may enable different visualizations, audibilizations, and/or haptifications that enable humans to understand and/or interpret environments that are impractical to directly sense (e.g., inside another organism, in inhospitable environments, etc.).

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant or implementation. The appearances of such phrases in various places in the specification are not necessarily all referring to the same embodiment, variant or implementation.

As used herein, the term "computer program" or "software" is meant to include any sequence or human or machine cognizable steps which perform a function. Such program may be rendered in virtually any programming language or environment including, for example, C/C++, C #, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/ or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed is:

1. A method of capturing and delivering instantaneous metadata, comprising:
    capturing media data according to a prescribed parameter;
    recording metadata according to the prescribed parameter, the metadata corresponding to at least one aspect of the media data;
    encoding the media data within a first data structure comprising a first synchronization data;
    encoding the metadata within a second data structure comprising a second synchronization data, where the first synchronization data and the second synchronization data enable synchronization of the media data and the metadata; and
    delivering the media data and the metadata to a post-processing device.

2. The method of claim 1, wherein capturing the media data comprises capturing audio data and visual data at a video frame rate.

3. The method of claim 1, wherein recording the instantaneous metadata comprises recording orientation, velocity, or acceleration data at a video frame rate.

4. The method of claim 1, further comprising receiving the metadata from a networked device.

5. The method of claim 1, further comprising encoding the media data and the metadata within a common data structure.

6. The method of claim 1, further comprising synchronizing the media data and the metadata within a common data structure.

7. The method of claim 1, where the first synchronization data and the second synchronization data comprise a shared reference event.

8. A media capture apparatus, comprising:
    a first sensor configured to capture media data;
    a second sensor comprising an inertial measurement unit and configured to record capture conditions of the first sensor;
    digital processor apparatus; and
    storage apparatus in data communication with the digital processor apparatus and having a non-transitory computer-readable media comprising one or more instructions which when executed by the digital processor apparatus, causes the media capture apparatus to:
    capture the media data at a rate;
    record the capture conditions of the first sensor at the rate;
    encode the media data within a media data structure; and encode the capture conditions within an instantaneous metadata data structure comprising in-camera stabilization data.

9. The media capture apparatus of claim 8, wherein the first sensor comprises an audio/visual sensor and the media data comprises video data at a video rate.

10. The media capture apparatus of claim 9, where the capture conditions comprise orientation, velocity, or acceleration data at each video frame.

11. The media capture apparatus of claim 8, where the first sensor comprises a first camera and a second camera,
where the second sensor comprises a proximity detector, and
where the instantaneous metadata data structure comprises a warp track for image stitching.

12. The media capture apparatus of claim 8, further comprising a network interface for connecting to an other media capture device,
wherein the one or more instructions when executed by the digital processor apparatus, further causes the digital processor apparatus to:
receive additional instantaneous metadata from the other media capture device.

13. The media capture apparatus of claim 12, further comprising synchronization logic configured to synchronize the additional instantaneous metadata received from the other media capture device.

14. The media capture apparatus of claim 8, further comprising a network interface for connecting to a post-processing device,
wherein the one or more instructions when executed by the digital processor apparatus, further causes the digital processor apparatus to:
stream the media data structure and the instantaneous metadata data structure to the post-processing device during capture.

15. The media capture apparatus of claim 8, where the one or more instructions, when executed by the digital processor apparatus, further causes the media capture apparatus to stabilize the media data using the in-camera stabilization data.

16. A post-processing apparatus, comprising:
a network interface;
a user interface;
digital processor apparatus in data communication with the network interface; and
storage apparatus in data communication with the digital processor apparatus and having a non-transitory computer-readable media comprising one or more instructions which when executed by the digital processor apparatus, causes the post-processing apparatus to:
obtain media data and instantaneous metadata, the media data comprising audio data and video data;
select a presentation parameter for the user interface comprising a point-of-view; and
render the media data based on the presentation parameter and the instantaneous metadata comprising cropping the video data to the point-of-view and mixing the audio data based on the point-of-view.

17. The post-processing apparatus of claim 16, the instantaneous metadata comprises an orientation; and
the media data is rendered based on a difference between the point-of-view and the orientation.

18. The post-processing apparatus of claim 16, where the presentation parameter comprises a visualization rule based on the instantaneous metadata.

19. The post-processing apparatus of claim 16, where the presentation parameter comprises an audibilization rule based on the instantaneous metadata.

20. The post-processing apparatus of claim 16, where the media data and the metadata are synchronized within a common data structure.

* * * * *